United States Patent
Silberstein et al.

(10) Patent No.: US 10,454,869 B2
(45) Date of Patent: Oct. 22, 2019

(54) COMPUTERIZED SYSTEM AND METHOD FOR CONTROLLING ELECTRONIC MESSAGES AND THEIR RESPONSES AFTER DELIVERY

(71) Applicant: OATH INC., New York, NY (US)

(72) Inventors: Natalia Silberstein, Haifa (IL); Irena Grabovitch-Zuyev, Haifa (IL); Iftah Gamzu, Haifa (IL); Noa Avigdor-Elgrabli, Haifa (IL); Yoelle Maarek, Haifa (IL); Liane Lewin-Eytan, Haifa (IL)

(73) Assignee: OATH INC., New York, NY (US)

(*) Notice: Subject to any disclaimer, the term of this patent is extended or adjusted under 35 U.S.C. 154(b) by 149 days.

(21) Appl. No.: 15/805,369

(22) Filed: Nov. 7, 2017

(65) Prior Publication Data

US 2019/0140996 A1    May 9, 2019

(51) Int. Cl.
| | | |
|---|---|---|
| *G06F 15/16* | (2006.01) | |
| *H04L 12/58* | (2006.01) | |
| *G06F 17/27* | (2006.01) | |
| *G06Q 10/10* | (2012.01) | |
| *H04W 4/12* | (2009.01) | |

(Continued)

(52) U.S. Cl.
CPC ............ *H04L 51/18* (2013.01); *G06F 16/951* (2019.01); *G06F 17/2715* (2013.01); *G06F 17/2785* (2013.01); *G06N 20/00* (2019.01); *G06Q 10/107* (2013.01); *G06Q 10/109* (2013.01); *G06Q 50/01* (2013.01); *H04W 4/12* (2013.01); *H04L 51/22* (2013.01); *H04W 88/184* (2013.01)

(58) Field of Classification Search
CPC ......... H04L 51/18; H04L 51/22; G06N 20/00; G06F 16/951; G06F 17/2715; G06F 17/2785; G06Q 10/107; G06Q 10/109; G06Q 50/01; H04W 4/12; H04W 88/184
USPC .......................................................... 709/206
See application file for complete search history.

(56) References Cited

U.S. PATENT DOCUMENTS

| | | | | |
|---|---|---|---|---|
| 8,572,496 | B2* | 10/2013 | Koopman | ............... H04L 51/14 |
| | | | | 709/206 |
| 2002/0138582 | A1* | 9/2002 | Chandra | ................ G06Q 10/10 |
| | | | | 709/206 |

(Continued)

OTHER PUBLICATIONS

Extended European Search Report to corresponding EP Application No. 18204833.0 dated Feb. 28, 2019 (12 pages).

*Primary Examiner* — Atta Khan
(74) *Attorney, Agent, or Firm* — James J. DeCarlo; Greenberg Traurig, LLP

(57) ABSTRACT

Disclosed are systems and methods for improving interactions with and between computers in content searching, hosting and/or providing systems supported by or configured with devices, servers and/or platforms. The disclosed systems and methods for efficiently monitoring and following up on delivered messages for which a user expects and/or requires a reply. The disclosed functionality provides a fully automated, personalized, easy and efficient way to identify and manage outgoing mail messages that require reply by marking outbound messages as RSVP messages, which are those messages determined to require a reply. Such functionality is based on the ability of the disclosed framework to distinguish between a "satisfactory response" (i.e., a response that includes the required information) and a response that is not.

18 Claims, 10 Drawing Sheets

(51) Int. Cl.
*G06N 20/00* (2019.01)
*G06F 16/951* (2019.01)
*G06Q 50/00* (2012.01)
*H04W 88/18* (2009.01)

(56) References Cited

U.S. PATENT DOCUMENTS

| | | |
|---|---|---|
| 2009/0287776 A1 | 11/2009 | Corry et al. |
| 2010/0030578 A1* | 2/2010 | Siddique ............ G06Q 10/0637 |
| | | 705/3 |
| 2014/0337441 A1 | 11/2014 | Schnitman et al. |
| 2015/0200906 A1* | 7/2015 | Ganesh .................. H04L 51/34 |
| | | 709/206 |
| 2015/0215253 A1* | 7/2015 | Vemuri .................. H04L 51/12 |
| | | 709/206 |
| 2016/0147782 A1 | 5/2016 | Roseman et al. |

\* cited by examiner

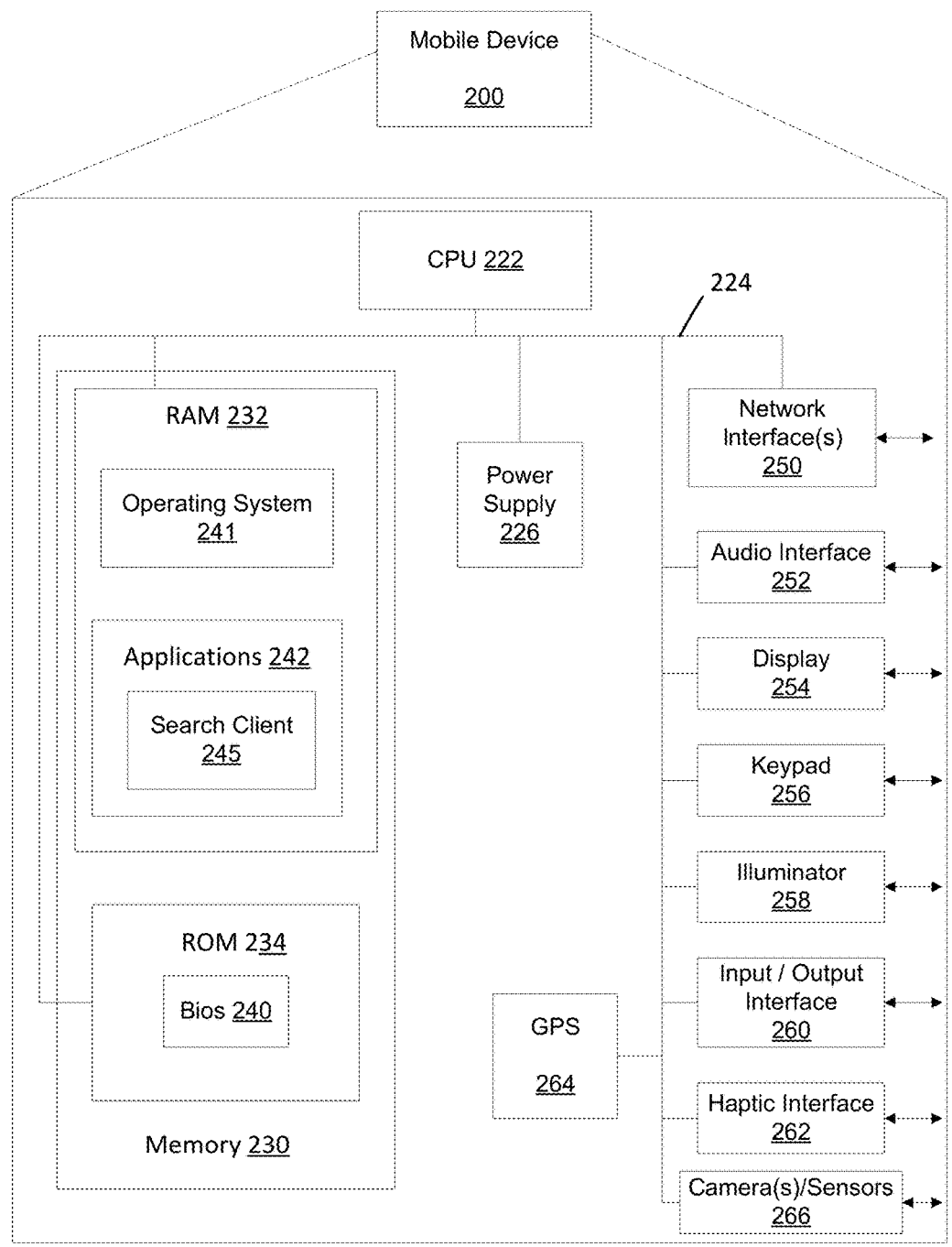

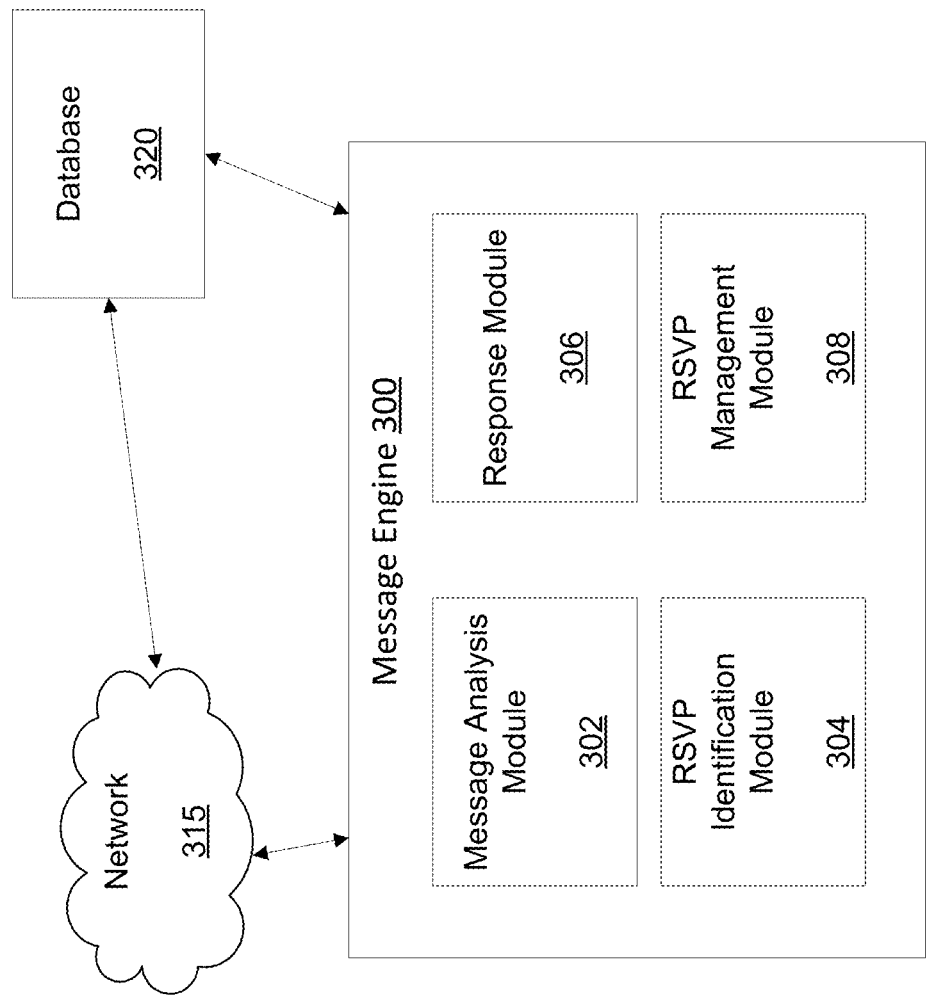

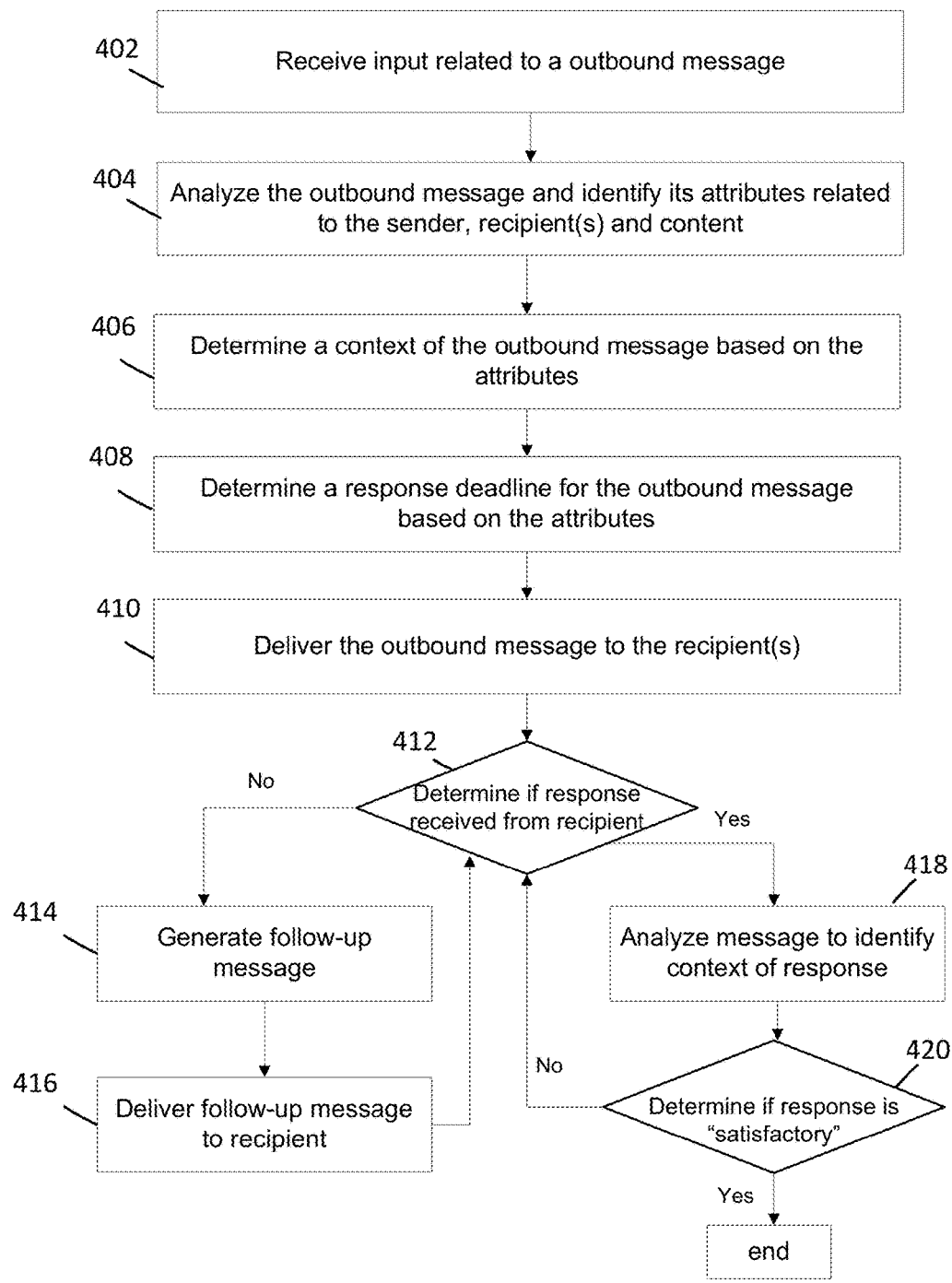

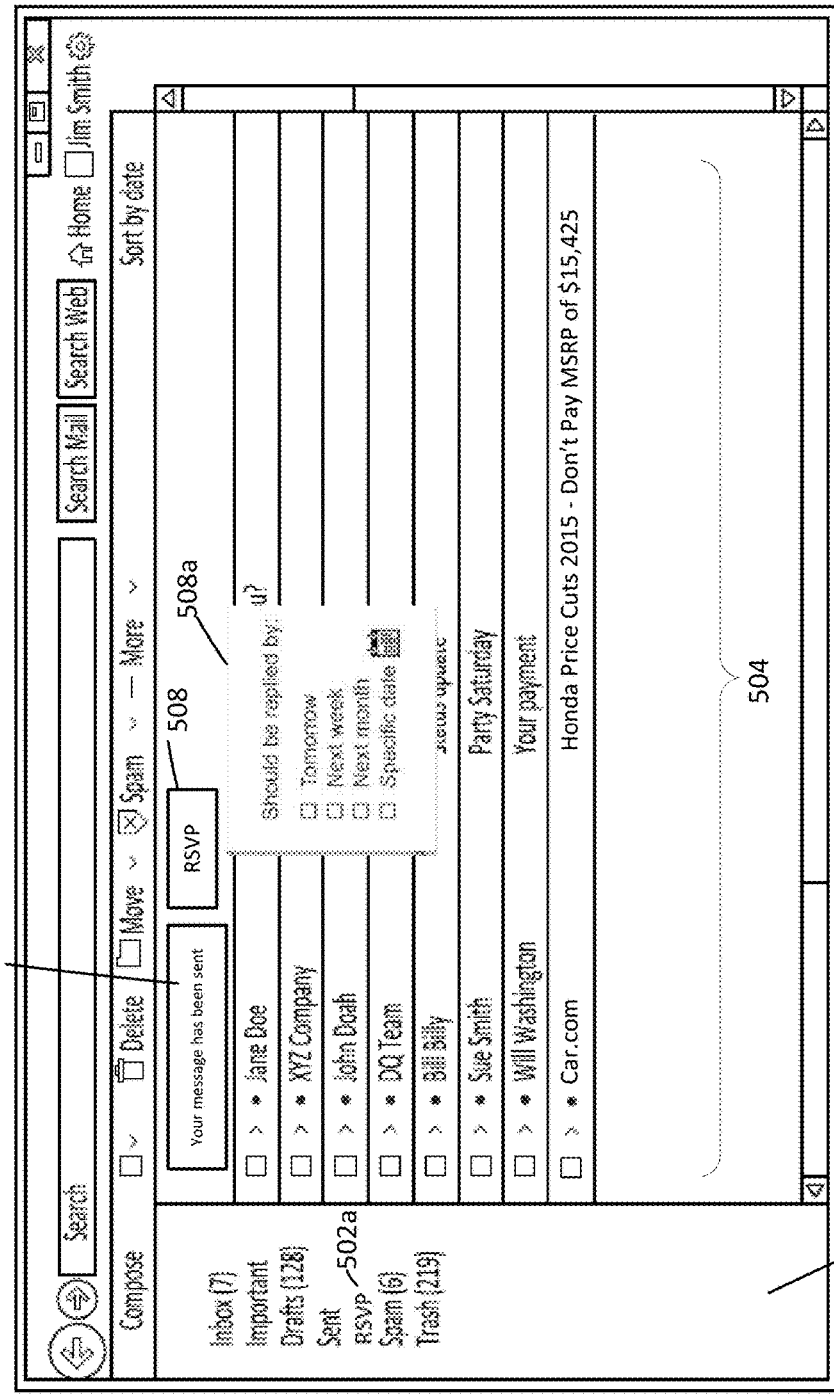

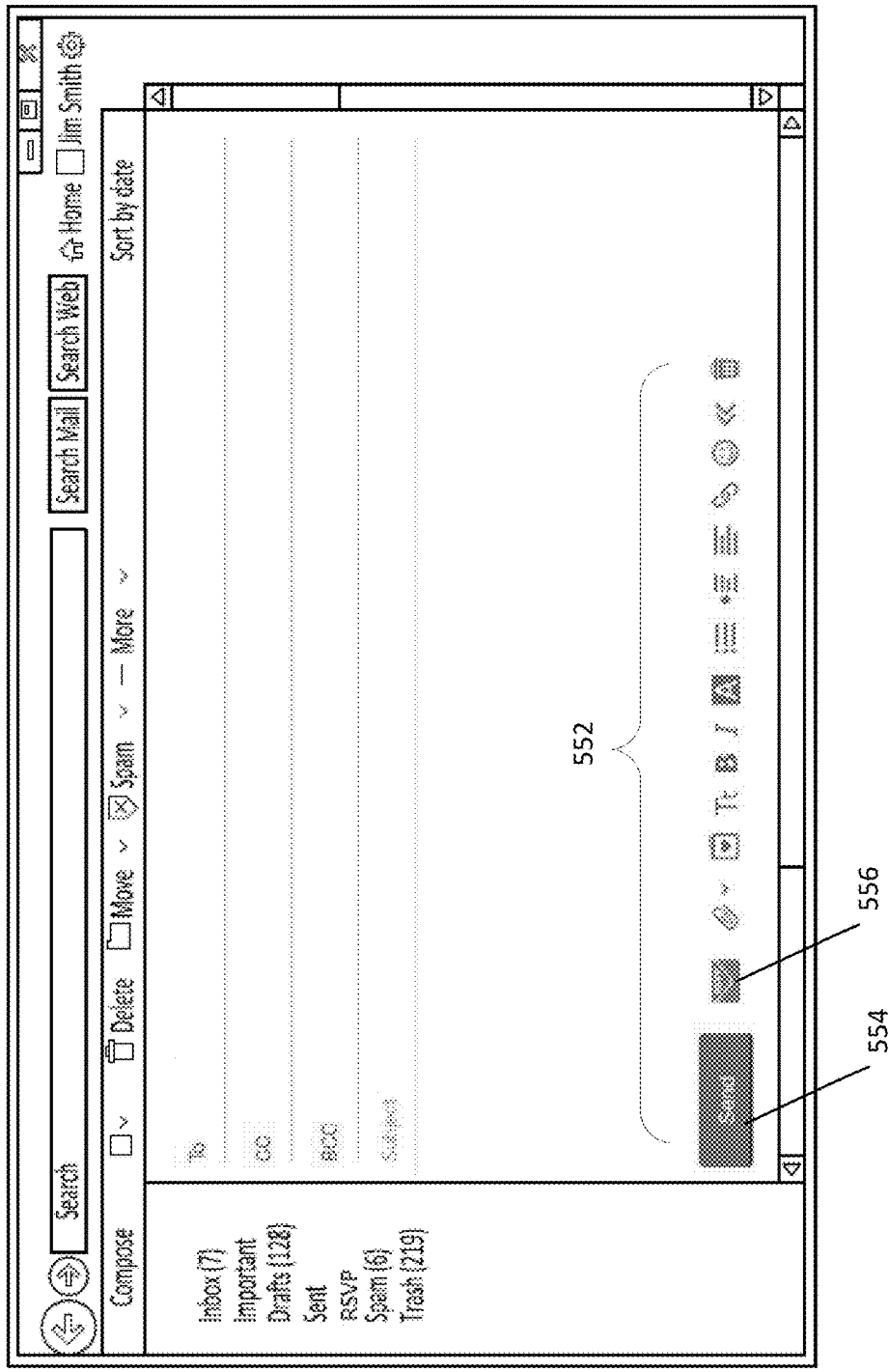

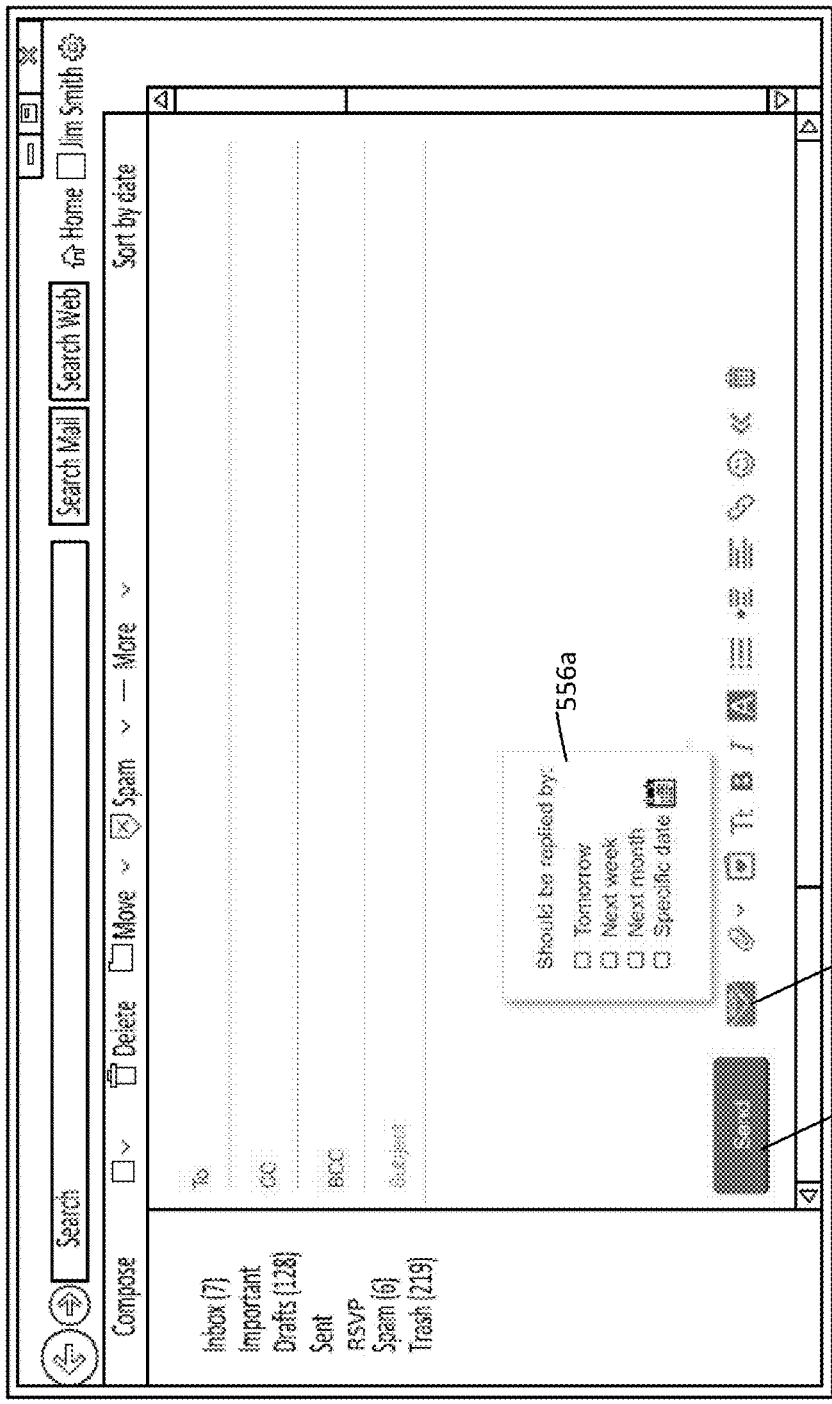

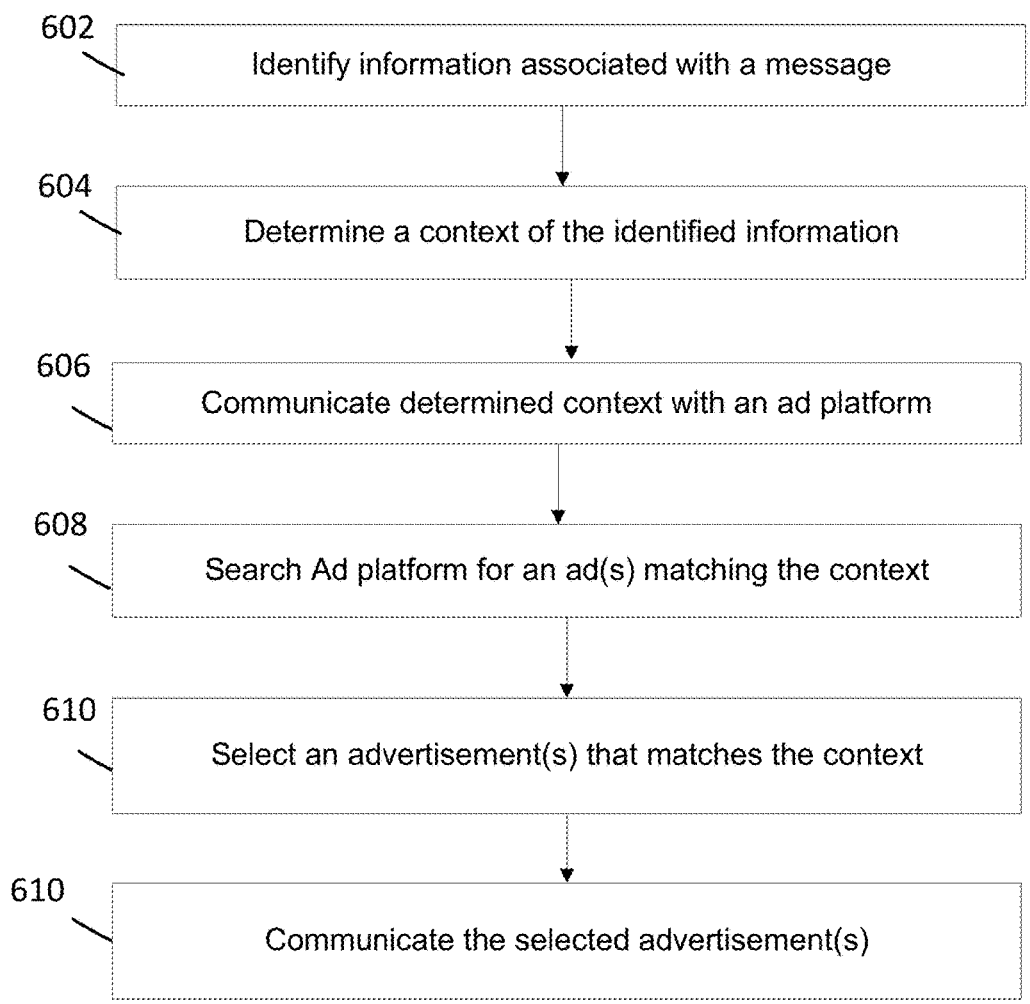

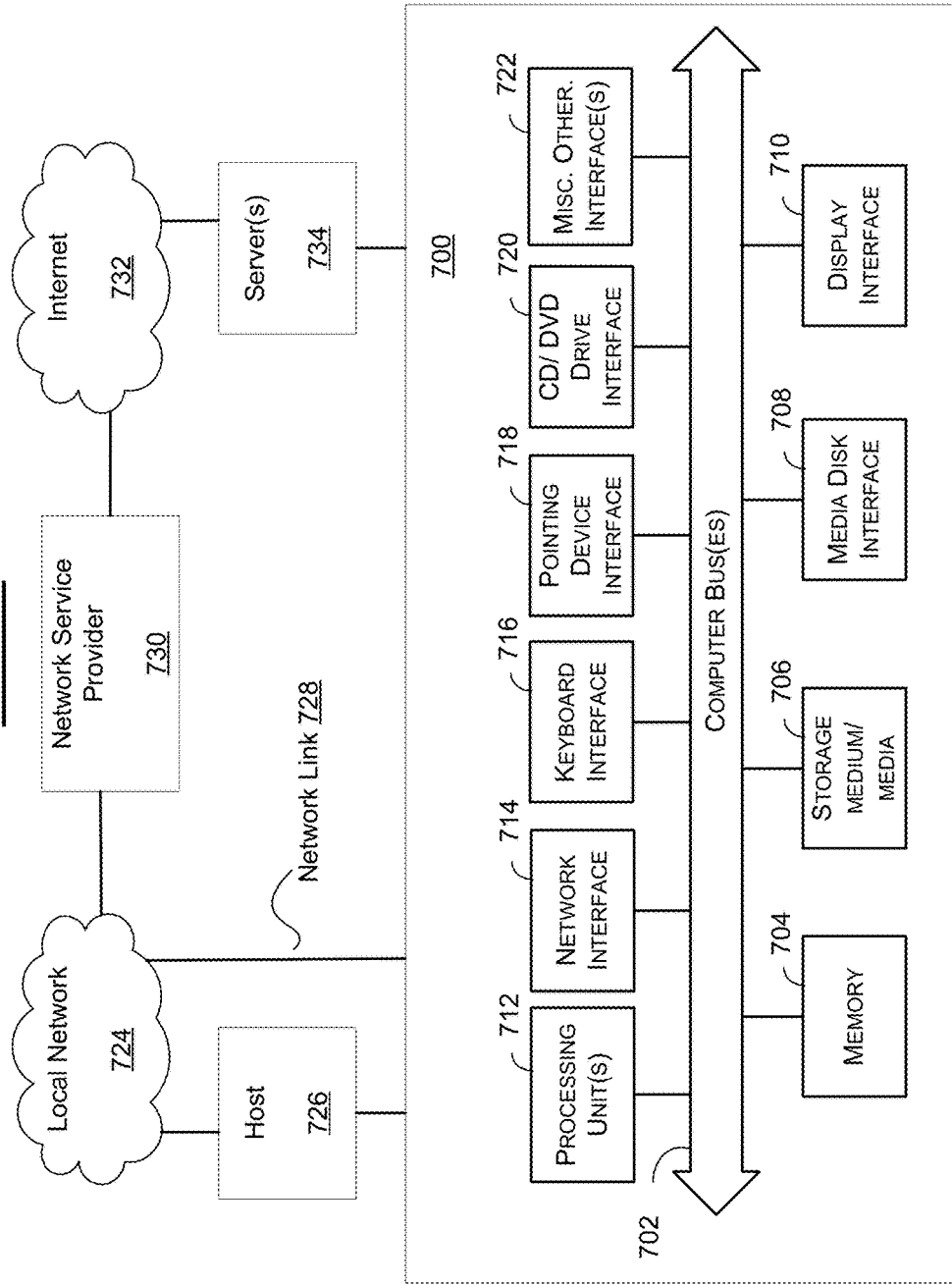

COMPUTERIZED SYSTEM AND METHOD FOR CONTROLLING ELECTRONIC MESSAGES AND THEIR RESPONSES AFTER DELIVERY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of messaging devices, systems and/or platforms by modifying the capabilities and providing non-native functionality to such devices, systems and/or platforms for a novel and improved framework for controlling the capabilities and functionality of messages after their delivery from a sending device or server.

SUMMARY

Electronic mailing and messaging services typically rely on the "fire-and-forget" paradigm, where the sender loses control of the conversation once the message has been sent. This paradigm is far from ideal in cases where the user needs to take specific actions if her messages remains unanswered.

For example, a user has applied for a job with multiple companies. The user will expect to receive responses within a certain time frame, and if no answer is received from his/her top choice, the user might decide to accept a competing offer. Another more classical scenario involves party planning, where a user sends an email inviting guests to a party. After the invitations have been sent, the user expects to receive timely responses from the invitees, who are typically asked to respond in a timely manner. In both these examples (or scenarios), the onus is solely on the sending user to remember to follow up on an earlier email, by sending a reminder to the recipients who are yet to answer. This task becomes tedious and error-prone as the number of emails awaiting for response grows, as well as confusing in keeping track of those users that may have already responded.

The instant disclosure provides a novel messaging framework for efficiently monitoring and following up on messages for which a user expects and/or requires a reply. For purposes of this disclosure, these types of messages will be referred to as "RSVP" messages. The disclosed systems and methods implement this messaging framework, which comprises several computerized components that relate to two phases in the lifecycle of RSVP messages: Phase 1 includes identifying outgoing messages as RSVP messages, and Phase 2 includes managing these RSVP messages until a "satisfactory" response has been received.

According to some embodiments, as discussed in more detail below, Phase 1 involves automatically analyzing outgoing messages, and based on such analysis, which includes identifying the text, content or other data within the message, identifying a message as an RSVP message—which means it requires a follow-up. In some embodiments, this identification process can further involve presenting the sending user an option which enables the user to set a date for which a follow-up is to be sent. In some embodiments, the identification of the date for the follow-up message is automatically determined based on the analyzed data of the message, which triggered Phase 1, which is discussed in more detail below.

Phase 2, then, involves maintaining a list of RSVP messages (e.g., a pointer to a delivered message, a copy of the message, and the like, stored in a database of the server and/or sending device) in order to determine whether a response was received, and if the received response was "satisfactory." This maintained list comprises information that i) indicates whether data within a received response message constitutes a "satisfactory response" (i.e., a message that addresses the context of the RSVP message), ii) information notifying the sending user when a due date approaches or passes, and iii) information offering an automatically-generated message that can be sent as follow up.

Thus, the disclosed systems and methods enable a delivered message to be automatically monitored and controlled by a sending device (e.g., client or server device). This provides additional functionality for a messaging platform that includes, but is not limited to, automatically determining which messages require a follow-up prior to, or upon delivery (as discussed below), then after delivery and upon determining that such follow-up is to occur, automatically enabling such follow-up to occur (either by providing a user with options to follow-up, or automatically following up without requiring user input). Therefore, in some embodiments, the disclosed messaging framework provides a computerized solution for automatically managing a user's inbox and the messages that are sent and received therefrom, thereby ensuring that any outbound messages having outstanding or delinquent replies are addressed in a timely manner.

The instant disclosure provides a solution to the existing problem of important messages falling "through the cracks" of a user's inbox/outbox. As discussed herein, the disclosed technology enables outgoing messages to be automatically managed by the sending device, the messaging platform, the application executing the messaging platform, or some combination thereof, thereby ensuring that control over delivered messages is maintained until an adequate response has been received. This ensures that important messages, or even messages that simply require a reply, are given their correct, respective attention required by a recipient in a timely manner.

In accordance with one or more embodiments, the instant disclosure provides computerized methods for executing the messaging framework discussed herein, as well as a non-transitory computer-readable storage medium for carrying out the above mentioned technical steps of the messaging framework. The non-transitory computer-readable storage medium has tangibly stored thereon, or tangibly encoded thereon, computer readable instructions that when executed by a device (e.g., messaging server, client device, and the like) cause at least one processor to perform a method for a novel and improved framework for controlling the capabilities and functionality of messages after their delivery from a sending device or server.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating an example of client device in accordance with some embodiments of the present disclosure;

FIG. 3 is a schematic block diagram illustrating components of an exemplary system in accordance with embodiments of the present disclosure;

FIG. 4 is a flowchart illustrating steps performed in accordance with some embodiments of the present disclosure;

FIGS. 5A-5D illustrate non-limiting embodiments of message control functionality according to some embodiments of the present disclosure;

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
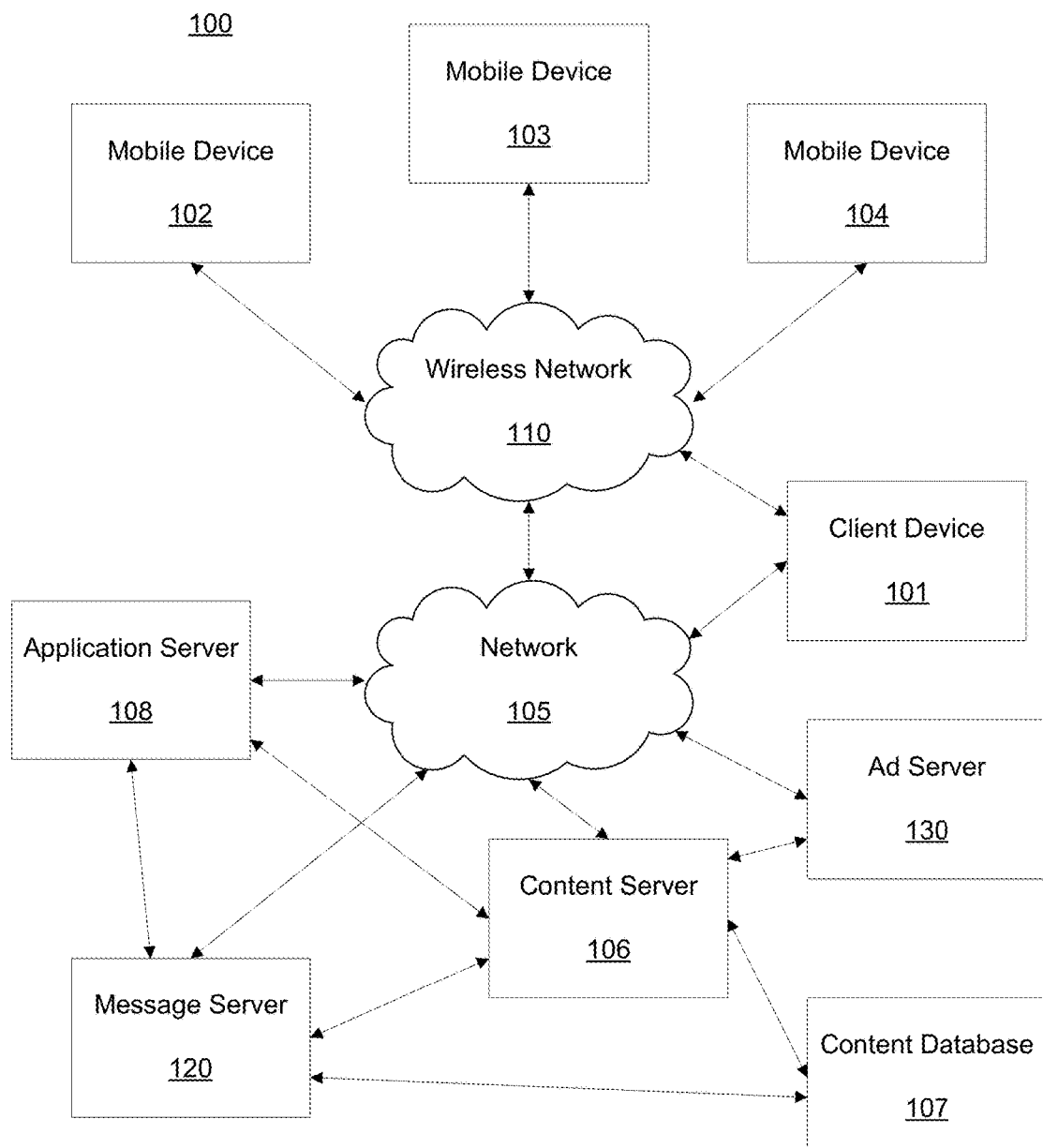
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/ or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide a novel framework for message platforms and services, and their provided mailboxes and user interfaces (UI), for monitoring, tracking and controlling messages after their delivery as a solution to conventional mail or messaging systems that do not have functionality for determining which messages require a reply before, during or after their delivery.

As discussed in more detail below, the disclosed systems and methods provide advanced functionality, from a messaging platform, for efficiently monitoring and following up on messages for which a user expects and/or requires a reply (referred to as RSVP messages). The disclosed systems and methods comprise several computerized components that identify outgoing messages as RSVP messages, and then enable the management of such messages after their delivery. Such management occurs across devices and over a network as it involves determining if a timely response has been received, sending follow-up messages when responses have not, and determining if received responses properly include content addressing the context of the RSVP message.

As discussed in more detail below (see, e.g., FIG. 4), the messaging framework implemented by the disclosed systems and methods analyzes outbound messages (also referred to as a composed message), and automatically provides determines whether the outbound message is an RSVP message (i.e., a message that requires a reply). This enables a target reply date to be set, such that when the target date is determined to be approaching or has passed, a follow-up message can be sent that reminds the recipient of their obligation to respond to the RSVP message. Additionally, in some embodiments, the disclosed framework provides novel user interface (UI) functionality for the messaging UI, where a special view for RSVP messages is provided that displays indicators as to which messages have been marked as RSVP messages, which ones have outstanding replies, and capabilities for the user to manage the target date even after delivery of the RSVP message (see FIGS. 5A-5D, discussed below).

In some embodiments, the disclosed framework automatically identifies that an RSVP message has been answered in a "satisfactory" manner. For purposes of this disclosure, as discussed in more detail below, "satisfactory" refers to a response message comprising content that addresses the content included in the RSVP message. For example, if a sender sends a recipient a message that asks "Are you free Friday night?", the disclosed framework can recognize that a response message from the recipient that states "I will get back to you later" is insufficient. In some embodiments, a RSVP message that has received a "satisfactory" response can be either marked differently within the view (up to manual removal, or automatic removal at the target reply date) or automatically removed when responded (from the RSVP folder, as discussed in more detail below in relation to FIGS. 5A-5D).

In some embodiments, the disclosed framework automatically generates a notification that the RSVP due date is approaching or has passed, which can be associated with a reminder message consisting of the original RSVP-tagged message preceded by predetermined template responses, such as, for example "This is a gentle reminder that we are expecting your answer to the following request." In such embodiments, these messages can be automatically sent, and in some embodiments, the user can decide to forward the reminder as is, edit it and send, or simply ignore it.

By way of a non-limiting example, on Monday, user Bob drafts a message to send to user Jane. In the message, Bob types: "Are you coming over on Sunday to watch the game between the Giants and Cowboys?" Upon sending the message, the disclosed framework can analyze the message and determine that a reply is required by at least Friday. The framework also determines the context of the message is related to confirming or denying availability in watching a football (or sports) event. The message is delivered to Jane, and Bob waits for a reply.

In some embodiments, on Thursday, noticing that a reply has not been received by Bob, the framework generates and sends a follow-up message to Jane notifying her that she has an outstanding message from Bob. In some embodiments, the follow-up message can be sent on any day after its delivery.

In some embodiments, when Jane responds, her response is analyzed to determine whether it addresses the context of Bob's message. Bob's message asked if she was coming over on Sunday to watch a game, therefore, if Jane does not address this in her response message, a follow-up can be sent to her indicating that a response is still outstanding. For example, if Jane simply replies—"Go Cowboys"—this does not necessarily indicate whether she will be there for the game—therefore, a follow-up can be sent restating Bob's question.

While the disclosure herein will be discussed in relation to a message sent to a single recipient, it should be understood by those of skill in the art that the instant disclosure provides support for outgoing messages that have multiple recipients. In some embodiments, for messages with multiple recipients, outbound messages marked as RSVP messages will have separate flags (or tags) for each recipient, which can be maintained individually for those recipients that have not yet responded in advance of a target (or due) date.

Some conventional systems provide functionality for enabling a message follow-up; however, not only does their functionality differ from the disclosed framework's, but their capabilities do not encompass the spectrum of message management provided herewith.

For example, some conventional systems generally track messages that have been sent but have not received a response. These systems do not provide the personalized framework disclosed herein, which learns and detects that the user is interested in a response for his/her message within a time frame, and automatically sets (or suggests the user to set) a follow up notification in case no response is received by that time. Thus, these types of conventional systems are in contrast to offering tracking for any message sent by the user. Furthermore, in case a response was received, the disclosed framework automatically detects whether this is the end of the conversation or whether a further follow up is required, which is not performed by any known system. Thus, the disclosed systems and methods are based on personalized monitoring and detection of end-to-end correspondence, and do not simply provide the capacity to mark messages as pending a response.

In another example, some conventional systems provide protocols for monitoring recipient activity on received messages. This is different from the disclosed functionality as the instant disclosure focuses on tracking activity from the sender side in relation to whether they have received a response to a tagged message (e.g., targets the need of the sender), and not tracking recipient activity on received messages.

Thus, the disclose systems and methods provide an advanced framework that integrates novel capabilities and functionality into the messaging platforms users are using to engage in messaging activity over the Internet. The disclosed functionality provides the user with a fully automated, personalized, easy and efficient way to identify and manage outgoing mail messages that require reply. The disclosed systems and methods recommend marking outbound messages as RSVP messages, which are those messages determined to require a reply. Such functionality is based on the ability of the disclosed framework to distinguish between a "satisfactory" response (i.e., a response that includes the required information) and a response that is not.

As discussed in more detail below at least in relation to FIG. 6, according to some embodiments, information associated with, derived from, or otherwise identified from, during or as a result of a message delivery (inclusive of an RSVP (or outbound) message and a response message), as discussed herein, can be used for monetization purposes and targeted advertising when providing, delivering or enabling such devices access to messages, media and/or applications provided over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message (or messaging) server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or content server 106, message server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-6.

FIG. 3 is a block diagram illustrating the components for performing the systems and methods discussed herein. FIG. 3 includes a message engine 300, network 315 and database 320. The message engine 300 can be a special purpose machine or processor and could be hosted by a messaging server, application server, content server, social networking server, web server, search server, content provider, email service provider, ad server, user's computing device, and the like, or any combination thereof.

According to some embodiments, message engine 300 can be embodied as a stand-alone application that executes on a user device. In some embodiments, the message engine 300 can function as an application installed on the user's device, and in some embodiments, such application can be a web-based application accessed by the user device over a network. In some embodiments, the message engine 300 can be installed as an augmenting script, program or application to another messaging and/or media content hosting/serving application, such as, for example, Yahoo! ® Mail, Yahoo! ® Messenger, Yahoo!® Search, Flickr®, Tumblr®, Twitter®, Instagram®, SnapChat®, Facebook®, and the like.

The database 320 can be any type of database or memory, and can be associated with a content server on a network (e.g., content server 106, message server 120, ad server 130 or application server 108 from FIG. 1) or a user's device (e.g., device 101-104 or device 200 from FIGS. 1-2). Database 320 can comprise, for example, a dataset of content items, device data and associated metadata, and user data and associated user metadata. Such information can be stored in the database 320 independently and/or as a linked or associated dataset. It should be understood that the data (and metadata) in the database 320 can be associated with any type of content, user, device or network information and type, whether known or to be known, without departing from the scope of the present disclosure.

Database 320 comprises a dataset of data and metadata associated with content items. For purposes of the present disclosure, reference to content items will be made with regard to electronic messages (comprising digital content) as a whole; however, it should not be construed to limit the applications of the systems and methods discussed herein. While reference is made throughout the instant disclosure to electronic messages, other forms of electronic documents or transmissions (e.g., Short Message Service (SMS) messages, Multi-media Message Service (MMS) messages, and the like) can be communicated and/or accessed and processed by the message engine 300 according to the systems and methods discussed herein. For example, detection of a message requiring a follow-up can be based on any type of item within a message or electronic document or file, and such items can include any type of known or to be known form of digital content, whether as a whole file or included within a file, including, messages, text, audio, video, short form videos, multi-media, and the like.

The messages and the data and metadata of such messages processed according to the disclosed systems and methods, and stored in database 320, can be any type of message. Examples of such messages can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages can be provided to the message engine 300 or accessed by a computer program or device that can access the messages. In some embodiments, the messages can be stored in a database of stored messages 320, which is associated with an email provider, such as Yahoo! Mail®.

Database 320 can also comprise a dataset of data and metadata associated with local and/or network information related to users, devices, services, applications, user-generated content, third party provided content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user account(s), user interests, user behavioral information, user attributes, user preferences or settings, user demographic information, user location information, user biographic information, and the like, or some combination thereof.

According to some embodiments, the user data can also include, for purposes searching, receiving and/or displaying messages, rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, messaging platforms, applications, sites, or providers that enable users to send, receive, search for, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, and the like). In some embodiments, database 320 can comprise data and metadata associated with such information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message engine 300, and the database of stored resources 320. Indeed, as illustrated in FIG. 3, the message engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message engine 300, and includes message analysis module 302, RSVP identification module 304, response module 306 and RSVP management module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 details steps performed in accordance with some embodiments of the present disclosure for efficiently monitoring and following up on delivered messages for which a user expects and/or requires a reply. The disclosed functionality provides a fully automated, personalized, easy and efficient way to identify and manage outgoing mail messages that require a reply by marking outbound messages as RSVP messages, and determining if a proper reply is received. As discussed herein, such functionality is based on the ability of the disclosed framework to distinguish between a "satisfactory" response (i.e., a response that includes the required information) and a response that is not.

Steps 402-404 of Process 400 are performed by the message analysis module 302 of the message engine 300; Steps 406-410 are performed by the RSVP identification module 304; Steps 412 and 418-420 are performed by the response module 306; and Steps 414 and 416 are performed by the RSVP management module 308.

Process 400 begins with Step 402 where a user begins drafting a message to a recipient. As discussed herein, Step 402 can involve a user entering any type of data into a message on any type of message communication platform. Such data can include, but is not limited to, text, media, attachments, and the like. The platform can include, but is not limited to, an email platform, IM platform, social media platform, and the like. Therefore, for example, Step 402 involves a user drafting or composing a message addressed to a recipient(s), as understood by those of skill in the art. This message is referred to as an outbound message, and at this point in the process, it has not yet been sent to the recipient.

In Step 404, either prior to sending or upon sending (e.g., receiving a send command from the sender, where the message is sent to the server for processing), the message is analyzed in order to identify the attributes included therein. These attributes correspond to the data input by the user during the drafting of the outbound message. For example, the attributes include information related to the message body of the outbound message, information related to the sender and information related to the recipient.

According to some embodiments, such analysis and identification occurring in Step 404, can be performed by implementing and/or executing any known or to be known software or technology that performs, but is not limited to, natural language processing (NLP), n-gram analysis, vector translation and analysis, and the like, or some combination thereof. Therefore, as a result to Step 404, the message engine 300 parses, identifies then extracts the attributes of the message.

According to some embodiments, the message attributes comprise message features (e.g., from the message body), sender features and recipient features. The message features can be extracted from the message itself (e.g., content and metadata from within the message body). Examples of such features include, but are not limited to, frequent sentences and n-grams and their location in the message, punctuation marks, both in the subject and the body; a number of recipients, to/cc/bcc; attachments (type), and the like. The sender features can be extracted from the mailbox of the sender. They represent the sender's past messaging behavior, which can include, for example, a number of messages sent by the sender, number of replies received by the sender, number of times the sender used the RSVP functionality discussed herein, and the like. The recipient features can be extracted from both incoming and outgoing traffic involving the recipient over/on the message platform being utilized to draft the message. For example, such features can include, but are not limited to, actions performed by the recipient in relation to an entire set of users, e.g., the number of messages the specific recipient replied to, or actions performed by the other recipients from messages sent by this recipient.

After the identification of these attributes/features, the message engine 300 generates a feature vector for the outbound message. The nodes on the vector represent the attributes/features of the message, sender and recipient. Such generation of the vector can be performed by any type of known or to be known vector generation software, technology or technique including, but not limited to, word2vec analysis, cluster analysis, data mining, Bayesian network analysis, Hidden Markov models, artificial neural network analysis, logical model and/or tree analysis, and the like.

Therefore, Step 404 results in a vector M for the outbound message, where each node on the vector corresponds to the attributes of the message. The vector M also includes a binary bit (referred to as a flag above) that indicates if M is an RSVP message.

As discussed in more detail below, the message engine 300 can implement a machine learning (ML) classifier that can have two sub-classifiers: a first classifier to decide whether an outgoing message is an RSVP message, and a second classifier that decides, given an RSVP message, whether a response message is a satisfactory response to the RSVP message.

As discussed herein, and in more detail below, the first classifier is based on a created feature vector and a label that indicate if a given message is an RSVP message (where a bit/flag can be set to "1" if so, and set to "0" if not). The first classifier can be based on a set of labeled examples that can be generated from past outgoing messages that are known as either RSVP messages or non-RSVP messages. In some embodiments, these messages can be collected from the a user's inbox, or from a plurality of users' inboxes. In some embodiments, the indication as to whether these training messages are RSVP messages can be based on user and/or editorial review.

Based on this set of training messages, the messages' features are extracted and are fed to a ML algorithm and the ML classifier is learned. As discussed herein, first classifier of the ML classifier can get a new message, extract its features, generate the vector and apply the ML model that will classify the message as RSVP or not. Similarly, for the second classifier, the labeled examples of pairs of messages (e.g., an outgoing message and a response) can indicate whether the response to the outgoing message was satisfactory, and the second classifier can be trained therefrom. Therefore, when analyzing a response message, the second classifier can apply its ML model to determine if that response is satisfactory, as discussed in more detail below. Thus, training of the first and second classifiers effectuates the building/training of the ML classifier that is applied by the message engine 300.

Therefore, in some embodiments, Step 404 involves implementation of the first classifier of the ML classifier that decides whether the outbound message is an RSVP message or not, and this decision dictates the value of the bit (and Steps 418-420, as discussed in more detail below, involves implementing the second classifier in order to determine whether a received response to the RSVP message was satisfactory).

In some embodiments, the analysis and identification occurring in Step 404 can involve identifying the a relationship between the sender and recipient of the outbound message by searching the mailbox of the sender to identify messages communicated previously between the sender and recipient. These messages can then be analyzed in a similar manner to identify and extract the attributes of such messages, which can supplement the attributes identified for the outbound message.

These are referred to as sender-recipient features which represent correspondence patterns between the sender and recipient. For example, these features provide data indicating the number of messages sent by the sender to the recipient (and vice versa), the number of replies received, frequency of communication, or past actions performed by the sender and recipient on those messages (both incoming and outgoing). Therefore, in some embodiments, these additional attributes can be added to and represented within the compiled vector M of the outbound message.

In Step 406, either prior to sending or upon sending by the server (in a similar manner as discussed above in relation to Step 404), the message is also analyzed in order to determine a context of the outbound message. Such context analysis can be based on the analysis discussed above in relation to the message features. Therefore, based on the features of the message, a context can be determined.

For example, message analysis of the text of a message, via NLP executed by the message engine 300, indicates that the message comprised a question to the recipient. Therefore, the determination of the context of the message can involve modifying the vector M by adding a designation that the message's response must at least answer either in the affirmative or the negative, as discussed below. This designation can be represented by a node or bit on vectorM.

In Step 408, in a similar manner as discussed above in relation to Steps 404-406, a response deadline (or target date) can be set for the message. The target date can be set by performing analysis on the message (either based on the above discussed analysis or a separate analysis process), where the message features of the message indicate a date upon which a reply is requested or required.

For example, if the message states that the sender is having a party on Dec. 25, 2017, and wants to know if the recipient is attending by Dec. 10, 2017, then via, for example, NLP, the date of December $10^{th}$ can be identified, whereby the target date can be set accordingly. As such, the message can have a further designation appended therewith indicating the determined target date, which can be represented by a node or bit on vectorM.

In some embodiments, the target date can be set by the user. In some embodiments, the target date can be set by the user after sending the outbound message or during drafting of the outbound message, as discussed in more detail below in relation to FIGS. 5B and 5D, respectively. In some embodiments, the target date can be recommended to the user, and the user can select from a set of recommended dates. In some embodiments, the user can modify the target date even after delivery of the message.

In some embodiments, Steps 406-408 can be performed in the same computational process, and in some embodiments, Steps 406-408 can be performed during the processing of Step 404, since the attributes/features derived from Step 404 form at least a basis of the determination occurring in Steps 406-408.

In Step 410, the outbound message is marked as an RSVP message indicating that a reply is expected according to the set target date, and is sent to the recipient for delivery in the inbox of the recipient. This marking involves applying and setting the bit (or flag) to the vector M thereby indicating the outbound message is subject to the disclosed RSVP functionality (as set in Step 404). Therefore, in some embodiments, in Step 410, based on the analysis of at least Step 404, as discussed above, via implementation of the first classifier of the ML classifier applied by the message engine 300, the outbound message can be marked as an RSVP message.

In Step 412, after sending the message to the recipient, the sender's mailbox is continuously or periodically (according to a predetermined time-period) monitored for a response to the RSVP message. Such monitoring involves determining if a response has been received, and if not, whether this represents a situation where a reply should have been received by then. For example, if the RSVP message was sent yesterday, and the target date is one week from then, then the determination occurring in Step 412 would result in a decision that no-reply is required to be received (or expected to be received yet).

Upon a determination that a reply is to have been received already but has not (e.g., via a comparison between the current monitored time and the target date satisfying a threshold time thereby indicating a response should have been received), Process 400 proceeds from Step 412 to Step 414, where a follow-up message is generated. For example, if a reply was to be received yesterday, but it has not been received, or a reply is expected in 2 hours, but no activity has been detected in the sender's mailbox from the recipient in relation to the sent RSVP message, then Step 414 is executed by the message engine 300. The generated follow-up message can be generated according to a variety of different techniques.

In some embodiments, the follow-up message can be selected by a user from a preset listing of follow-up messages. For example, a list can be presented to a user that includes a listing of selectable template responses—for example, "Just following up from my message dated _____. Please let me know", which can be provided as a caption (or subject line) of a forward of the RSVP message. In some embodiments, the follow-up message can be automatically generated by the message engine 300, and it can comprise content similar to the original message along with a notification that the original message has an outstanding reply.

In some embodiments, the generated follow-up message can be delivered automatically to the recipient upon its generation, Step 416, which can occur upon its generation by the engine 300, or upon selection by the sender, as discussed above. In some embodiments, the follow-up message can also be marked as an RSVP message, in a similar manner as discussed above in relation to Steps 402-412.

Turning back to Step 412, should a response message (or reply message, used interchangeably) from the recipient be detected/received in the sender's mailbox, then Process 400 proceeds from Step 412 to Step 418, where the response message and the RSVP message are analyzed in order to determine if the response message is a "satisfactory" response to the RSVP message.

According to some embodiments, Step 418 involves analyzing, using the second classifier of the ML classifier (as discussed above and in more detail below) both the response and RSVP message to extract the features of each message. For example, upon detecting the response message in the sender's mailbox, the response message and the RSVP message are analyzed by the ML classifier which parses each message and extracts the features of each message. The ML classifier then generates a feature vector R which is based on both the response message and the RSVP message. Vector R may also contain features extracted from previous messages in the threads containing one of the messages. Vector R may also be depend on any other information, such as, but not limited to, general user information of the sender and recipient and/or past conversations between them, and the like.

In Step 420, vector R is then analyzed by the second classifier of the ML classifier, and a determination is made regarding whether the response message is a "satisfactory" response to the RSVP message. As discussed above, the second classifier will classify the response message based on the features and labels, where, in some embodiments, the labels in the training set can be obtained based on the past interactions of users with the manual RSVP feature.

In some embodiments, Steps 418-420 involve determining the attributes of the response message and formulating a vector R for the response (in a similar manner as discussed above for vector M. In some embodiments, the generation of the vector R can be based on attributes identified from the message engine 300 analysis of the attributes of the response message (i.e., the inbound message that was sent by the recipient of the given RSVP message), the attributes of that RSVP message, and of all the previous messages in the thread containing the RSVP message and the response message (which can include the follow-up message should one have been sent—from Step 416). In addition, the message engine 300 analyzes information about the sender and the recipient, and the past correspondence between the sender and the recipient can be included in vector R.

As discussed above, in some embodiments, the identification of the attributes (or features) of an outbound message, the identification of the outbound message as a RSVP message, the identification of the attributes of a response message, and the identification that the response message is "satisfactory" can be performed by the message engine 300 executing any known or to be known machine learning techniques, algorithms, software or technology that identifies attributes of a digital item, compares it against a known or learned training set (e.g., message activity in the sender's inbox), and makes a determination as to whether a previously applied status (e.g., a message marked as a RSVP message, and/or whether that RSVP message has received a satisfactory reply) changes as a result of the comparison. Such machine learning (ML) technology can include, but is not limited to, Sparse Factor Analysis (SFA), Deep Neural Networks (DNN), Hidden Markov Models (HMMs), Support Vector Machines (SVMs), Bayesian Methods, and the like.

For example, upon the composition of the outbound message, the message engine 300 can execute the ML classifier (i.e., the first and second classifiers, as discussed above) which will pull offline data related to the sender's account, and determine the attributes of the outbound message to include in the generated vector M. As this message is sent, it can be marked as a RSVP message (via the first classifier of the ML classifier, as discussed above). Upon receiving a response message and generating vector R (as discussed above), the second classifier of the ML classifier is applied to determine if the response message is a "satisfactory" response to the RSVP message.

Figure 5A:
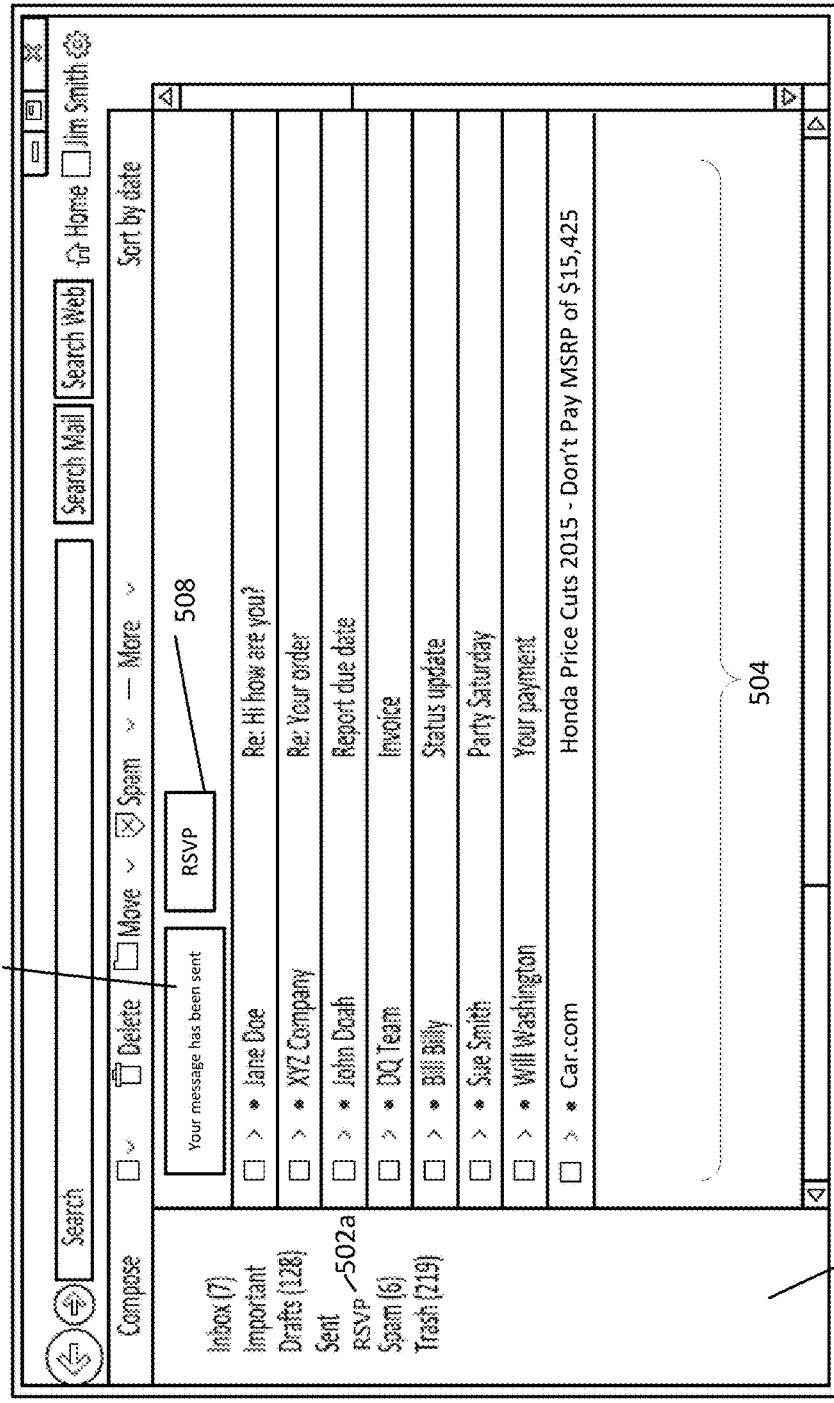

Turning to FIGS. 5A-5D, each provides a non-limiting example of a sender's inbox upon sending and composing an RSVP message, respectively. In FIGS. 5A-5B, sender mailbox UI 500 is depicted, which includes the folder portion 502, message listing 504 (depicting a user's inbox message activity) and interface items 506 and 508, which indicate that a message was just sent, and there is RSVP functionality assigned to it, respectively.

The folder portion 502 depicts a "RSVP" folder (item 502a) which provides a separately generated sub-folder to the sender's inbox for managing RSVP messages. In some embodiments, when a RSVP message is sent, it is sent (or a copy is sent) to the RSVP folder 502a, and when a "satisfactory" response is received, it is removed from the RSVP folder 502a. In some embodiments, should the RSVP message have multiple recipients, the RSVP message will only be removed from RSVP folder 502a when all recipients have provided a "satisfactory" response.

Item 506 is an interface item that provides an indication that the user just sent a message. As discussed above in relation to Process 400, the sent outbound message can be marked as a RSVP message; therefore, when this occurs, item 508 is displayed, which provides an indication that the message was a RSVP message, or, in some embodiments, provides functionality for the sent message to be designated by the user as an RSVP message.

In some embodiments, as depicted in FIG. 5B, the item 508 carries functionality that enables interaction by the user to select a target date≥item 508a, which shows a drop-down or pop-up window being displayed as generated from item 508. In some embodiments, the provided listing of target date options can be determined by the message engine 300, and in some embodiments, the user can enter a specific date.

FIGS. 5C-5D depicts UI 550 which is the message composition interface where the sending user composes the outbound message for delivery to a recipient. UI 550 includes a toolbar 552 that provides interactive tools for the sender to modify the message, the message text, insert graphics, and the like. Toolbar 552 can be displayed as part of the message body, or included in the toolbar of the UI 550, UI 500 or the browser or application interface displaying the UIs. Toolbar 552, among other functions, includes a function to send the message (item 554) and a function indicating RSVP functionality (as discussed herein) of the message (item 556).

In some embodiments, as the user composes the message, or after completing the message, or upon the user selecting the send item 554, the message engine 300 can determine that the message is a RSVP message (as discussed above), and item 556 can be automatically displayed within toolbar 552. In some embodiments, item 556 is displayed, and it allows the sender to designate the message as a RSVP message, whereby upon selecting item 556, item 556a is displayed (as in FIG. 5D). Item 556a provides similar functionality as item 508a discussed above, which enables selection, viewing or entering of a target date for the outbound message, thereby designating the message as an RSVP message.

FIG. 6 is a work flow example 600 for serving relevant digital media content associated with or comprising advertisements (e.g., digital advertisement content) based on the information associated with a sent message, as discussed above in relation to FIGS. 3-5D. Such information, referred to as "message information" for reference purposes only, can include, but is not limited to, information associated with a RSVP message (e.g., the attributes of the outbound message, as discussed above), information (e.g., attributes) of a response message, the response due date, the context of the outbound message, the context of the response message, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, message information is identified. As discussed above, the message information can be based any of the information from processes outlined above with respect to FIGS. 3-5D. For purposes of this disclosure, Process 600 will refer to single sent message and response as the basis for serving a digital advertisement(s); however, it should not be construed as limiting, as any number of messages, as well as programs used and/or content items included therein can form such basis, without departing from the scope of the instant disclosure.

In Step 604, a context is determined based on the identified message information. This context forms a basis for serving advertisements related to the message information. In some embodiments, the context can be in accordance with the context of the RSVP message or response message, as discussed above in relation to FIG. 4. For example, a message can include content indicating that hunting season is starting on November 1st; therefore, the context identified in Step 604 can be related to "hunting" or other "in-season outdoors activities" and can be leveraged in order to identify digital ad content related to such activities, as discussed herein in relation to the steps of Process 600. In some embodiments, the identification of the context from Step 604 can occur before, during and/or after the analysis detailed above with respect to Process 400, or it can be a separate process altogether, or some combination thereof.

In Step 606, the determined context is communicated (or shared) with an advertisement platform comprising an advertisement server 130 and ad database. Upon receipt of the context, the advertisement server 130 performs (e.g., is caused to perform as per instructions received from the device executing the message engine 300) a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to view, compose, send, receive and/or render messages or media. Step 612. In some embodiments, the selected advertisement is sent directly to each user's (sender and recipient) computing device. In some embodiments, the selected advertisement is displayed within a portion of the interface or within an overlaying or pop-up interface associated with the messaging interface used to send/receive messages.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files.

Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, at a computing device, input provided by a sender, said input comprising information related to composition of a message addressed to a recipient on a message platform;
    analyzing, via the computing device, said input, and based on said analysis, extracting attributes related to the composed message, said attributes comprising features of the message, features of the sender and features of the recipient;
    generating, via the computing device, a feature vector M for said composed message based on said identified attributes, said vector M comprising nodes related to said message features, sender features and recipient features;

determining, via the computing device, a target date for said composed message, said target date being a time a reply to said composed message is expected to be received after sending of said composed message;

applying, via the computing device, said target date to said composed message, said application causing said composed message to be tagged as an RSVP message, such that said vector M has a bit added indicating whether a reply has been received, said bit initially set to "0" indicating no reply has yet been received;

sending, via the computing device, said RSVP message to said recipient;

receiving, via the computing device, a response message from said recipient in an inbox of said sender, said response message being sent by the recipient as a reply to said RSVP message;

analyzing, via the computing device, said response message, and based on said analysis, extracting attributes of the response message, said analysis further comprising generating a feature vector R based on the attributes of the response message, said response message attributes comprising message features of the response message, features of the recipient and features of the sender;

determining, via the computing device executing a machine learning (ML) classifier, whether said response message is a satisfactory response to said RSVP message based on said vector M and vector R, said determination further comprising:

marking, via the computing device, said RSVP message bit as "1", thereby indicating to said message platform that said response message is received and is satisfactory, when the classifier classifies the response as satisfactory, and generating, via the computing device, a follow-up message to said recipient indicating that the response was not satisfactory, when the classifier classifiers the response as a not satisfactory;

updating, via the computing device, said inbox of said sender based on said RSVP message tagging, said updating comprising populating a RSVP folder with said RSVP message; and upon said response message being determined satisfactory, removing, via the computing device, said RSVP message from said RSVP folder.

2. The method of claim 1, further comprising:
periodically monitoring, based on said target date, said inbox of the sender for said response message to said RSVP message from said recipient, said periodic monitoring occurring during a time period between a time the RSVP message was sent and a time prior to said target date;

determining, based on said monitoring, that said response message has not been received; and generating and sending a follow-up message to said recipient, said follow-up message comprising information at least referencing said RSVP message and providing an indicating that a response to said RSVP message is outstanding.

3. The method of claim 1, wherein said context of the RSVP message provides an indication as to a type of content included in said RSVP message, and an indication as to a type message content within a response message that addresses said context.

4. The method of claim 2, wherein said context is represented as a node on said vector M.

5. The method of claim 1, wherein said attributes further comprise sender-recipient features related to a relationship between the sender and recipient, wherein said vector M further comprises at least one node related to said sender-recipient features.

6. The method of claim 5, wherein said sender-recipient features comprise information related to past message activity between the sender and recipient on said message platform.

7. The method of claim 1, wherein:
said message features comprise content and metadata extracted from a body of the message,
said sender features comprise information extracted from the inbox of the sender indicating past messaging behavior by the sender, and
said recipient features comprise information extracted from said message platform indicating messaging activity by the recipient on said message platform.

8. The method of claim 1, wherein said analysis of the input is performed by the computing device executing natural language processing (NLP) software on the input of the composed message.

9. The method of claim 3, wherein said determination of the context and the target date are performed by the computing device executing natural language processing (NLP) software on the input of the composed message.

10. The method of claim 1, wherein said composed message is addressed to a plurality of recipients.

11. The method of claim 10, wherein said RSVP message is assigned a bit for each recipient, and is only determined to be completely responded to when each bit for each recipient is set at "1".

12. The method of claim 1, further comprising:
determining, via the computing device executing the ML classifier, whether the composed message is an RSVP message, wherein said applying said target date is performed based on said determination.

13. A non-transitory computer-readable storage medium tangibly encoded with computer-executable instructions, that when executed by a processor associated with a computing device, performs a method comprising:

receiving, at the computing device, input provided by a sender, said input comprising information related to composition of a message addressed to a recipient on a message platform;

analyzing, via the computing device, said input, and based on said analysis, extracting attributes related to the composed message, said attributes comprising features of the message, features of the sender and features of the recipient;

generating, via the computing device, a feature vector M for said composed message based on said identified attributes, said vector M comprising nodes related to said message features, sender features and recipient features;

determining, via the computing device, a target date for said composed message, said target date being a time a reply to said composed message is expected to be received after sending of said composed message;

applying, via the computing device, said target date to said composed message, said application causing said composed message to be tagged as an RSVP message, such that said vector M has a bit added indicating whether a reply has been received, said bit initially set to "0" indicating no reply has yet been received;

sending, via the computing device, said RSVP message to said recipient;

receiving, via the computing device, a response message from said recipient in an inbox of said sender, said response message being sent by the recipient as a reply to said RSVP message;

analyzing, via the computing device, said response message, and based on said analysis, extracting attributes of the response message, said analysis further comprising generating a feature vector R based on the attributes of the response message, said response message attributes comprising message features of the response message, features of the recipient and features of the sender;

determining, via the computing device executing a machine learning (ML) classifier, whether said response message is a satisfactory response to said RSVP message based on said vector M and vector R, said determination further comprising:

marking, via the computing device, said RSVP message bit as "1", thereby indicating to said message platform that said response message is received and is satisfactory when the classifier classifies the response message as satisfactory, and generating, via the computing device, a follow-up message to said recipient indicating that the response was not satisfactory when the classifier classifies the response message as a non-satisfactory;

updating, via the computing device, said inbox of said sender based on said RSVP message tagging, said updating comprising populating a RSVP folder with said RSVP message; and upon said response message being determined satisfactory, removing, via the computing device, said RSVP message from said RSVP folder.

14. The non-transitory computer-readable storage medium of claim 13, further comprising:

periodically monitoring, based on said target date, said inbox of the sender for said response message to said RSVP message from said recipient, said periodic monitoring occurring during a time period between a time the RSVP message was sent and a time prior to said target date;

determining, based on said monitoring, that said response message has not been received; and generating and sending a follow-up message to said recipient, said follow-up message comprising information at least referencing said RSVP message and providing an indicating that a response to said RSVP message is outstanding.

15. The non-transitory computer-readable storage medium of claim 13, wherein said context of the RSVP message provides an indication as to a type of content included in said RSVP message, and an indication as to a type message content within a response message that addresses said context, wherein said context is represented as a node on said vector M.

16. The non-transitory computer-readable storage medium of claim 13, wherein said attributes further comprise sender-recipient features related to a relationship between the sender and recipient, wherein said vector M further comprises at least one node related to said sender-recipient features, wherein said sender-recipient features comprise information related to past message activity between the sender and recipient on said message platform.

17. The non-transitory computer-readable storage medium of claim 13, wherein:

said message features comprise content and metadata extracted from a body of the message, said sender features comprise information extracted from the inbox of the sender indicating past messaging behavior by the sender, and said recipient features comprise information extracted from said message platform indicating messaging activity by the recipient on said message platform.

18. A computing device comprising:

a processor; and a non-transitory computer-readable storage medium for tangibly storing thereon program logic for execution by the processor, the program logic comprising:

logic executed by the processor for receiving, at the computing device, input provided by a sender, said input comprising information related to composition of a message addressed to a recipient on a message platform;

logic executed by the processor for analyzing, via the computing device, said input, and based on said analysis, extracting attributes related to the composed message, said attributes comprising features of the message, features of the sender and features of the recipient;

logic executed by the processor for generating, via the computing device, a feature vector M for said composed message based on said identified attributes, said vector M comprising nodes related to said message features, sender features and recipient features;

logic executed by the processor for determining, via the computing device, a target date for said composed message, said target date being a time a reply to said composed message is expected to be received after sending of said composed message;

logic executed by the processor for applying, via the computing device, said target date to said composed message, said application causing said composed message to be tagged as an RSVP message, such that said vector M has a bit added indicating whether a reply has been received, said bit initially set to "0" indicating no reply has yet been received;

logic executed by the processor for sending, via the computing device, said RSVP message to said recipient;

logic executed by the processor for receiving, via the computing device, a response message from said recipient in an inbox of said sender, said response message being sent by the recipient as a reply to said RSVP message;

logic executed by the processor for analyzing, via the computing device, said response message, and based on said analysis, extracting attributes of the response message, said analysis further comprising generating a feature vector R based on the attributes of the response message, said response message attributes comprising message features of the response message, features of the recipient and features of the sender;

logic executed by the processor for determining, via the computing device executing a machine learning (ML) classifier, whether said response message is a satisfactory response to said RSVP message based on said vector M and vector R, said determination further comprising:

logic executed by the processor for marking, via the computing device, said RSVP message bit as "1", thereby indicating to said message platform that said response message is received and is satisfactory when the classifier indicates that the response message is satisfactory, and logic executed by the processor for generating, via the computing device, a follow-up message to said recipient indicating that the response was not satisfactory when the classifier indicates that the response message is not satisfactory;

logic executed by the processor for updating, via the computing device, said inbox of said sender based on said RSVP message tagging, said updating comprising populating a RSVP folder with said RSVP message; and logic executed by the processor for removing, via the computing device, upon said response message being determined satisfactory, said RSVP message from said RSVP folder.

* * * * *